Patented Oct. 4, 1932

1,881,119

UNITED STATES PATENT OFFICE

BARTLEY E. BROADWELL, OF LEWISTON, AND ARTHUR T. HINCKLEY, OF NIAGARA FALLS, NEW YORK, ASSIGNORS TO THE REPUBLIC CARBON COMPANY, OF NIAGARA FALLS, NEW YORK, A CORPORATION OF DELAWARE

ELECTRODE

No Drawing. Application filed January 4, 1930. Serial No. 418,649.

The present invention relates to electrodes and more especially to electrodes containing natural graphite, and to a process of forming such electrodes.

Natural graphite is a material having peculiar characteristics which well adapt it for use in electrodes, but which have heretofore prevented such use. Natural graphite is a flaky material, being made up of flakes or laminæ. The surfaces of the flakes are smooth as compared with artificial graphite, and therefore present surfaces resistant to oxidation in use. The smooth surfaces of the flakes, however, have rendered the natural graphite unsuitable in manufacture of electrodes by the usual processes, and attempts to make electrodes containing a material proportion of natural graphite have not met with success.

In addition to the desirable smooth and oxidation resisting surfaces of the natural graphite, natural graphite is relatively cheap and is available in large quantities.

The particles of natural graphite when subjected to shearing strains tend to rupture along cleavage planes between the flakes or laminæ. In making the mixes for electrodes, a sticky, viscous bituminous binder, such as tar or pitch, is usually employed, the mixture being heated to render the binder semi-fluid. In forming the mix the binder wets the surfaces of the solid particles of the mix and cements them together in the finished electrode.

It has been found, however, that where the binder is used in a mix containing a considerable proportion of natural graphite, and an attempt is made to form an electrode in the usual way, that certain weaknesses are developed. This weakness is apparently caused by the rupture and splitting of the graphite flakes or laminæ along their cleavage planes, exposing dry surfaces, that is, surfaces which have not been wet with the binder and which, therefore, do not have a good bond with the remainder of the material.

It has been found, for example, that if it is attempted to make an electrode from a mixture containing a considerable proportion of natural graphite by the customary extrusion process, the electrode thus formed is badly cored. This coring has been variable in degree, in many cases resulting in the formation of concentric conical sections which could actually be displaced one inside the other. When the graphite-containing mix is extruded through the extrusion die, the mix being extruded is subjected to severe mechanical strains, causing shearing stresses to be applied to the graphite particles. These shearing strains tend to turn the graphite flakes in the direction of the shearing motion and to rupture the flakes, causing the laminæ to slide over each other along their natural cleavage planes, tending to form slip planes in the electrode.

The surfaces of these cleavage or slip planes formed by the rupture of the graphite particles during the extrusion are, or tend to be, dry surfaces, that is, not wet by the binder, and therefore cause planes of weakness in the electrode. Such electrodes therefore would have a short life due to spalling along the slip planes between the laminæ or flakes. The same difficulty has been encountered in attempts to manufacture electrodes containing natural graphite by the other processes in vogue. For example, attempts to make such electrodes by the usual tamping processes have proved unsuccessful. In the tamping process the electrode is formed in a mold and a tamping tool having a number of projections or fingers is used to tamp the mix in the mold. The tamping fingers rupture the particles of the natural graphite and cause the cleavage or slippage planes between the laminæ or flakes as above described. The mix tends to adhere to the tamping tool and pack irregularly, so that irregular laminations roughly perpendicular to the direction of tamping are formed. The resultant electrode has structural weaknesses due to the dry cleavage planes and is also packed irregularly, so that the electrodes tend to not only spall, but also to overheat locally.

Attempts to form electrodes containing natural graphite by a simple pressing operation have also been unsuccessful, since the heavy pressures employed rupture the particles of natural graphite, forming the weakening cleavage or slippage planes between the flakes or laminæ as characterized by glazed surfaces similar to the familiar geological slickensides.

Attempts, therefore, to manufacture electrodes containing a material or considerable proportion of natural graphite have met with failure and have not been commercial despite the advantages which might be attained of using natural graphite in the electrodes, such as its low cost and smooth, relatively unpitted, oxidation resisting surfaces. So far as we are aware, no commercially successful electrodes have been made from a mix containing any material proportion, as, for example, 20% or over, of natural graphite. We have, however, succeeded in making electrodes mainly composed of or containing a considerable proportion of natural graphite, thus rendering available natural graphite for electrode use. These electrodes have not only the advantages incident to natural graphite, such, for example, as its smooth, unpitted oxidation resisting surfaces and its low cost, but also have certain novel and advantageous characteristics.

We will now describe more specifically the process of making our improved electrodes and their characteristics. We form a mix containing a suitable binder and a granular dry material containing a considerable proportion of natural graphite with or without other electrode materials, such as electrode scrap, carbon, and so forth. As a specific example, we make electrodes from a mix containing about 50% of crushed natural graphite having flakes about ¼″ in diameter on the average and about 50% of graphite flour or ground electrode scrap. The fineness of the material and the proportion of natural graphite to the dry portion of the mix may be varied to suit conditions. The mix may contain the natural graphite mixed with other materials, such as electrode scrap or graphitized carbon, or the mix may consist entirely of natural graphite as the dry portion of the mix. The dry materials are mixed with a suitable binder, for example, about 10% to 20% of a mixture of tar and pitch. The mixture is heated and thoroughly mixed to distribute the binder and wet the surfaces of the particles of the mix.

The electrode is formed from the mix by a jolting operation. The mix is placed in an electrode mold, which is raised and dropped against a stop or anvil so as to subject the mix to repeated jolting or jarring which consolidates it but without material rupture of the graphite particles, as would be the case in the usual extrusion, tamping or pressing operations. The mold is gradually filled while it is being jolted, and after the mold is filled a presser head is applied to the top of the mold to assist in the consolidation of the mix and the jolting of the mold is continued until the mix is consolidated to form the completed electrode.

A jolting mold which can be utilized for this purpose is described in the Doerschuk Patent No. 1,683,587 of September 4, 1928. Instead of the cam-held weight of the Doerschuk patent, we prefer to use a follower which positively and instantaneously follows up the momentary consolidation or settling of the mix at the moment of impact. Such a follower or presser head may be formed of a plunger fitting into the upper end of the jolting electrode mold and having above it a hydraulic chamber supplied with water under pressure through a small and instantaneously operating check valve which permits water under pressure to follow up the descent of the plunger at the moment of impact of the mold against the anvil, but which prevents the escape of the water and the tendency of the plunger to rebound. A hydraulic follower of this type is described in the pending application of Semmeon M. McAnulty, Serial #390,949, filed September 7, 1929.

The electrode mold is preferably heated to maintain the mixture in a plastic condition during the jolting and consolidating operation, which is continued until the desired density and orientation of particle is imparted to the electrode. The electrode is then preferably maintained under the pressure in the mold while it is chilled in order to prevent expansion of the mix during the chilling.

The forming of small carbon articles by simultaneous heating and pressing of cold mix containing the binder uniformly disseminated through the mass either in the form of finely comminuted particles or in the form of films upon the carbon particles is well known. This procedure fails to produce uniform density of the formed article when one dimension of the article is materially greater than the other two as in the case of a cylinder or parallellopiped whose length is several times its diameter, width or thickness. By forming such an article from such cold mix with simultaneous jolting and heating however, the desired density and desired orientation of particles is secured uniformly throughout the formed article together with uniform distribution of binder without the necessity of hot mixing prior to the placing of the mix in the mold, and this modification of the use of jolting in forming electrodes is also within the scope of our invention.

The electrode is then removed from the mold and baked at a temperature of approximately 800° to 1100° centigrade in the manner well-known in the art of making carbon electrodes. The baking transforms the viscous bituminous binder into a carbonized binder in the completed electrode in the usual way. The formed electrode may alternatively be heated high enough to graphitize the binder if so desired.

We have found it possible to produce an electrode containing natural graphite having a strength and density in excess of that obtainable by forming an electrode in the usual way, such as by the extrusion or tamping processes. It is possible to secure a graphite electrode having a density of up to 1.98 before baking and 1.83 after baking, although the densities of 1.6 or over after baking are satisfactory for general use. These densities may be compared with the usual densities of 1.56 for carbon electrodes after baking or 1.54 for graphitized electrodes formed in the usual way. The high density of the electrode, combined with the natural resistance to oxidation of the natural graphite, produces an electrode having an exceptionally long life in operation. This is of obvious advantage in giving a greater furnace yield per electrode and reducing the labor of changing electrodes. The life of our electrodes is greater than that of the usual graphitized electrodes of the same size and nearly double that of the usual carbon electrodes.

In addition to the high density, resistance to oxidation and long life, our electrodes have other valuable and characteristic properties. The natural graphite flakes are relatively thin compared with their width. During the jolting operation the flaky particles tend to so orient themselves that the flat faces lie in a plane normal to the direction of jolting, or at right angles to the axis of the electrode when the jolting is in a direction axially of the electrode. An electrode is therefore produced having a striated or laminated structure, which is, however, mechanically sound, uniform and substantially free from dry slip or cleavage planes. While it is preferred to jolt the electrode endwise so that the laminæ are normal to the axis of the electrode, it is possible by jolting the electrode sidewise to cause the laminæ to lie axially of the electrode. This arrangement of the thin flat natural graphite flakes, which constitute a considerable proportion of the electrode, results in certain desirable characteristics, such as that of selective thermal and electrical conductivity. The thermal conductivity is greater in the direction of the planes of the graphite flakes than it is normal to such planes, or in an electrode formed by endwise jolting the thermal conductivity axially of the electrode is reduced.

While the thermal conductivity axially of the electrode may be reduced somewhat if an electrode formed of irregular particles such as crushed coke or graphitized electrode scrap, as described in the Doerschuk Patent 1,683,587, the selective thermal conductivity is much more pronounced when the flaky natural graphite is employed.

The following table shows numerically observations of thermal conductivities. The first example is that of an electrode formed of carbon by the extrusion process and graphitized in the usual way. The second example is that of an electrode made from the normal mix containing natural graphite, such for example, as that of the specific example given above of an electrode containing about 50% of crushed natural graphite and about 50% of graphite flour or ground electrode scrap as the dry constituents of the mix, and jolted as herein described. The third example is of a mix consisting principally of a very flaky natural graphite and jolted as herein described:

|  | Axial | Lateral | Directional thermal conductivity ratio (axial/lateral) |
|---|---|---|---|
| (1) Graphitized | .176 | .137 | 1.28 |
| (2) Jolted normal mix | .0381 | .0459 | 0.83 |
| (3) Flaky graphite jolted | .0233 | .1314 | 0.18 |

The values for the thermal conductivity in the above table are given in calories per cubic centimeter, per degree centigrade, per second; mean values being between about 150° C. and 300° C.

As above shown, the ratio of axial to lateral conductivity of the graphitized electrode was greater than 1, whereas the jolted electrodes containing natural graphite had a ratio of axial to lateral conductivity of less than 1, the second example being about 5 to 6, and the third example being less than 1 to 5. The ratio of axial to lateral thermal conductivity in our electrodes will vary somewhat depending upon conditions, such as the proportion of natural graphite used in the mix, etc., but is in general lower than that of the usual graphitized electrodes or that obtainable by the use of irregularly shaped electrode-making materials even when subjected to jolting. The ratio of axial to lateral thermal conductivity in our electrodes is in general less than 1 and usually less than $7/8$.

The low ratio of axial to lateral thermal conductivity secured by the orientation of natural graphite flakes is of considerable advantage in impeding the flow of heat axially of the electrode to the outside of the furnace. Less heat is lost by conduction from the interior of the furnace, and the rate of oxidation and the "spindling" of the electrode is materially reduced. Because of the higher lateral thermal conductivity the internally generated heat can readily escape laterally of the electrode, thus preventing overheating.

Our electrodes when jolted with axis vertical also have a greater electrical conductivity laterally than axially, because of the orientation of the graphite particles transversely of the electrode axis. This tends to cause the current to distribute itself more uniformly over the cross-section of the electrode and probably assists in preventing spindling or the tendency of the electrode to eat back along the periphery faster than at the axis, which is encountered in the ordinary graphitized electrode or other electrode.

A further advantage of our electrodes in comparison with the extruded, molded or tamped types resides in a greater resistance to thermal shock. In the processes of extrusion, molding and tamping, the particles of the mix are subjected to mechanical shearing and other stresses which tend to break down the particle size and yield a fine grained body. In our electrodes the particles are not so broken down but retain their original size, and consequently our electrodes may be given a coarser texture, which better resists thermal shock, like a coarse textured firebrick in comparison with a fine textured firebrick.

Tests have indicated that there is less tendency to pitting or to spindling than in the usual graphitized electrodes as heretofore made. For example, with an electrode originally 8" in diameter we have found that toward the end of the life of the electrode the lower end of the electrode had a diameter of approximately 7½", whereas an electrode of the ordinary graphitized type at a similar stage had a diameter at the lower end of 6 to 6½" and tapered back for a considerably greater distance from the end than was the case with our electrode.

In our electrodes we have entirely overcome the difficulties encountered in previous and unsuccessful attempts to utilize natural graphite in electrodes, and we have produced electrodes having the requisite structural strength, homogeneity and freedom from spalling due to cleavage planes. The greater homogeneity of our electrodes results in a steadier arc as compared with ordinary electrodes in which internal variations in structure and resistance cause frequent variations in the position of the arc at the end of the electrode.

Our electrodes are to be distinguished from the so-called graphitized electrodes which are first formed of ungraphitized carbon and are subjected to heat treatment to graphitize the carbon in the electrode. Such graphitized electrodes are more expensive to make, they do not have the advantageous selective directional thermal and electrical conductivity, and do not have the graphite in the form of the smooth and unpitted oxidation resisting flakes of the natural graphite. Our electrodes are also to be distinguished from electrodes containing artificial graphite, such as electrode scrap. Artificial graphite does not have the smooth-surfaced flaky formation or the density of the natural graphite, but exists in irregular particles having pitted surfaces and therefore does not impart to the electrode the resistance to oxidation or the desirable selective thermal and electrical conductivities imparted by the natural graphite.

In addition to the desirable physical characteristics imparted to our electrode by the natural graphite, the electrodes are cheaper to make due to the relatively low cost of natural graphite.

While we have specifically described the preferred embodiment of our invention and the preferred process of making our electrodes, it is to be understood that the invention is not so limited but may be otherwise embodied and practiced within the scope of the following claims.

We claim:

1. An electrode containing a material proportion of natural graphite.

2. An electrode containing natural graphite to an amount over 20% of the dry constituents of the mix.

3. An electrode containing natural graphite to an amount at least 30% of the dry constituents of the mix.

4. An electrode containing natural graphite to an amount at least 50% of the dry constituents of the mix.

5. An electrode containing natural graphite as its major constituent.

6. An electrode containing natural graphite having its flakes oriented generally normal to the axis of the electrode.

7. An electrode containing natural graphite and a binder and substantially free from dry cleavage planes between the laminae of the graphite.

8. An electrode containing natural graphite having its particles in the substantially unruptured condition obtained by consolidating the electrode mix in a plastic state by a jolting operation.

9. An electrode containing natural graphite and characterized by the physical condition and orientation of the flaky graphite particles obtained by consolidating the electrode mix by a jolting operation.

10. An electrode containing natural graphite and having greater lateral than axial heat conductivity.

11. An electrode containing natural graphite and having a ratio of axial to lateral heat conductivity of less than seven-eighths.

12. An electrode containing natural graphite and having a ratio of axial to lateral heat conductivity of not over about 5 to 6.

13. An electrode containing natural graphite and having the greater lateral than axial heat conductivity obtained by consolidating the electrode mix by a jolting operation.

14. An electrode containing natural graphite and having a greater lateral than axial electrical conductivity.

15. An electrode containing natural graphite and having the selective heat and electrical conductivities and the density, mechanical strength and resistance to thermal shock obtained by the consolidation of the electrode mix in a plastic state by a jolting operation.

16. An electrode containing natural graphite and having a density of not less than 1.6.

17. An electrode containing natural graphite in an amount over 20% of the dry constituents of the mix and having the flaky graphite particles in a substantially unruptured condition and oriented in a direction generally normal to the axis of the electrode.

18. An electrode containing natural graphite in an amount over 20% of the dry constituents of the mix and a heat hardened bituminous binder and having a density of not less than 1.6.

In testimony whereof we have hereunto set our hands.

BARTLEY E. BROADWELL.
ARTHUR T. HINCKLEY.